United States Patent [19]

Haruta

[11] Patent Number: 4,677,445
[45] Date of Patent: Jun. 30, 1987

[54] RECORDING METHOD

[75] Inventor: Masahiro Haruta, Funabashi, Japan

[73] Assignee: Canon Kabushiki Kaisha, Tokyo, Japan

[21] Appl. No.: 615,177

[22] Filed: May 30, 1984

[51] Int. Cl.$^4$ .................... G01D 15/16; G01D 9/00; C09D 11/00
[52] U.S. Cl. ................... 346/1.1; 346/140 R; 106/22; 210/687
[58] Field of Search ............... 346/140 PD, 75, 1.1; 106/22; 210/687

[56] References Cited

U.S. PATENT DOCUMENTS

| | | | |
|---|---|---|---|
| 2,482,765 | 9/1949 | Haagensen | 210/687 |
| 4,260,827 | 4/1981 | Klinkmann | 210/687 |
| 4,285,727 | 8/1981 | Uehara | 106/22 |
| 4,445,124 | 4/1984 | Fujii | 346/75 |

Primary Examiner—E. A. Goldberg
Assistant Examiner—Mark Reinhart
Attorney, Agent, or Firm—Fitzpatrick, Cella, Harper & Scinto

[57] ABSTRACT

A method for recording images on a recording material by ejection of recording liquid through fine nozzle or nozzles, characterized in that said recording liquid is a liquid composition containing therein water-soluble dyestuff, and that concentration of calcium ion in said liquid composition is adjusted to 10 ppm or below.

10 Claims, No Drawings

RECORDING METHOD

BACKGROUND OF THE INVENTION

1. Field of the Invention

This invention relates to a recording method using recording liquid. More particularly, it is concerned with a method for recording images on a recording material such as paper, resin film, etc. with use of recording liquid which is generally called "ink" by means of an ink jet recording system or various writing implements such as fountain pens, felt-tip pens, and so forth.

2. Description of Prior Art

The ink jet recording system is such one that performs image recording by forming ink droplets and causing a part or whole of the droplets to adhere onto a recording material (hereinafter simply called "recording paper") by means of various ink ejection systems such as, for example, an electrostatic attraction system, a system which imparts mechanical vibration or displacement to ink by use of a piezoelectric element, a system which heats ink to form bubbles and ejects the ink droplets using a pressure of the formed bubble and others. In case use is made of writing implements, the recording ink is drawn out through the capillary bore and placed on the recording paper, as has been well known.

For the ink to be used in such ink jet recording system or writing implements, there may be exemplified, in general, one composed principally of a water-soluble dyestuff, water as the solvent to the dyestuff, and glycols as the desiccation-preventing agent. As the water-soluble dyestuff, direct dye, acid dye, and basic dye are used preferably, since they are excellent in their fastness and color tones, when recorded. Since those dyestuffs are produced for the purpose of dying textile fibers, they inevitably contain various impurities such as, for example, inorganic salts like sodium chloride, sodium sulfate, etc., and metals (ions) like calcium, magnesium, iron, silicon, etc.

When the recording ink is prepared with such dyestuffs containing various impurities as mentioned above, unfavorable situations would arise, as will be mentioned in the following. That is to say, solving stability of the dyestuff in ink becomes poor to bring about agglomeration and sedimentation of the dyestuff; and, when the ink becomes dried at the ink discharge orifice or in the vicinity of the capillary bore to change its composition, deposition of salts is brought about. These phenomena would be the cause for clogging the ink discharge orifice and the capillary bore, which must be avoided with utmost of the care in the image recording by use of the ink jet recording system or the writing implements. Although various proposals have been made as the measures for preventing such clogging, no perfect solution has yet been found.

When the ink is of a kind which tends to clog the ink discharge orifice, etc., the dyestuff concentration in the ink must be made low with the consequence that the density of the recorded image is not sufficient and devoid of its required quality, and its light fastness becomes also poor.

SUMMARY OF THE INVENTION

In view of the above-described disadvantages inherent in the conventional recording method by the ink jet recording system, the present inventors conducted various studies and experiment to find out a recording method which is free from any restriction on the dyestuff concentration in ink and yet does not bring about clogging of the ink discharge orifice. As the results, they have found out that the concentration of calcium ion ($Ca^{++}$) in ink took a great part in the clogging.

In more detail, they have found out that, when the calcium ion concentration in the ink became 10 ppm or below, and, more particularly, 3 ppm or below, no sedimentation could be recognized to occur in the ink, even when the ink was left standing for a long period of time, and that no clogging could be recognized to have taken place in the discharge orifice or the capillary bore filled with the ink.

The present invention has been made on the basis of the above-mentioned finding, and aims at providing an improved recording method which does not invite lowering of the recorded image density and quality, and deterioration in the light fastness, and yet does not bring about non-discharge of the ink from the recording means.

According to the present invention, in general aspect of it, there is provided a method for recording images on a recording material by ejection of ink through fine nozzle or nozzles, characterized in that said ink is a liquid composition containing therein water-soluble dyestuff, and that concentration of calcium ion in said composition is adjusted to 10 ppm or below.

Thus, the present invention makes it possible to consistently reproduce recorded image of good quality using the ink of improved properties such that it does not cause clogging of the discharge orifice in the ink jet recording device and the capillary bore in the writing implement over a long period of time, has high concentration of the dyestuff contained in it, and excellent in the light-fastness.

DETAILED DESCRIPTION OF THE INVENTION

In the following, the present invention will be described in detail with reference to preferred examples thereof.

The basic components for the ink to be used in the present invention are: (1) water-soluble dyestuff represented by direct dye, acid dye, and basic dye; and (2) solvent for the dye.

The solvent for the purpose comprises water as the principal liquid medium (the term "water" to appear throughout this specification is meant by "deionized water"). Mixtures of water and various water-soluble organic solvents may also be used.

For the water-soluble organic solvent, there may be exemplified various substances to be enumerated as follows: alkyl alcohols having the carbon atoms of from 1 to 4 such as methyl alcohol, ethyl alcohol, n-propyl alcohol, iso-propyl alcohol, n-butyl alcohol, sec-butyl alcohol, tert-butyl alcohol, iso-butyl alcohol, etc.; amides such as dimethyl formamide, dimethyl acetamide, etc.; ketones or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols, in which the alkylene group contains 2 to 6 carbon atoms, such as ethylene glycol, propylene glycol, butylene glycol, triethylene glycol, 1,2,6-hexane triole, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol mono-methyl (or -ethyl) ether, etc.; N-methyl-2-pyrrolidone, 1,3-dimethyl-2-imidazolidinone, and so forth.

Of the above-listed various water-soluble organic solvents, particularly preferred are polyhydric alcohols such as diethylene glycol, etc., and lower alkyl ethers of polyhydric alcohols such as triethylene glycol mono-methyl (or -ethyl) ether, etc.

The content of the water-soluble organic solvent in the ink ranges, in general, from 0 to 90% by weight based on the total weight of the ink, or preferably from 10 to 80% by weight, or more preferably from 20 to 50% by weight.

The content of water in this case may be determined in a broad range depending on the kind of the above-mentioned solvent, or its composition, or desired characteristic of the ink to be obtained. In general, it is in a range of from 10 to 99% by weight based on the total weight of the ink, or preferably from 10 to 70% by weight, or more preferably from 20 to 70% by weight.

In the following, explanations will be given as to the actual process for adjusting the concentration of calcium ion in the ink of the above-described composition. First of all, sodium sulfate is added to aqueous dyestuff solution of a desired concentration to salt-out the dyestuff. Subsequently, the deposited substance is filtered off, followed by washing the filtered substance with saturated pure water solution of sodium sulfate. Finally, the washed substance is dried. (By these process steps, calcium (ion) in the dyestuff is removed.) The thus obtained dry solid substance (refined dyestuff) is dissolved in a predetermined quantity into a water-soluble organic solvent, after which the solution is filtered. Then, a predetermined quantity of water and, depending on necessity, a predetermined quantity of additives are added to the filtered solution and stirred, thereby preparing the ink.

After the preparation, the concentration in the ink is measured by means of an atomic absorption spectrophotometer to verify whether the value is 10 ppm or below, at which the ink can be properly used for the ink jet recording. Incidentally, when preparing ink with the dyestuff concentration of from 1 to 5% by weight or so by the above-described ink preparation method, the calcium ion concentration in the ink can be adjusted easily and without failure to the abovementioned value of 10 ppm or below.

The thus obtained ink is excellent with its well-balanced properties such as the recording characteristics in the ink jet recording system (i.e., signal response, droplet forming stability, discharge stability, long-term continued recording capability, ink discharge stability after a long period of stoppage of the recording operation), storage stability, image fixability to the recording material, light-fastness, weather-resistance, etc. of the recorded image, and so forth.

With a view to enabling those persons skilled in the art to put the present invention into practice, and, at the same time, to exhibiting the effect to be derived from the ink of the present invention, the following preferred examples are presented, although the invention is not limited to these Examples alone.

EXAMPLE 1

Sodium sulfate was added to 20% aqueous solution of dyestuff available in general market ("WATER BLACK 187L" produced by Orient Chemical Co., Japan), and the mixture was stirred for salting-out of the dyestuff. The deposited substance was then filtered, washed with saturated pure water solution of sodium sulfate, and dried. The solid substance as dried was weighed in a predetermined quantity so as to render the dyestuff concentration in the prepared ink to be 3% by weight. The predetermined quantity of the dry solid substance as weighed was dissolved in a mixed solution of diethylene glycol and N-methyl-2-pyrrolidone (mixing ratio of 3:1). Subsequently, this solution was filtered under pressure through a "Teflon" filter having an average pore size of 1 micron. 40 parts by weight of this filtered liquid was mixed with 60 parts by weight of water, and stirred to prepare the ink. The calcium ion concentration in this ink as measured by the atomic absorption spectrophotometer was 1.8 ppm.

Using this ink with a recording apparatus having an "on-demand" type recording head to eject the ink by a piezo-vibrator (diameter of discharge orifice of 50 microns; drive voltage of piezo-vibrator of 60 volts; and frequency of 4 KHz), the following characteristics as identified by $T_1$ through $T_5$ were evaluated. The results were favorable for all characteristics. By the way, the diameter of the discharge orifice may be properly selected in a range of from 10 to 200 microns.

$T_1$ (long term storage property):

The ink was hermetically sealed in a bag made of plastic film, and kept for six months at a temperature of $-30°$ C. and $60°$ C. It was found that, even at the end of the storage period, there was no deposition of any insoluble components in the ink, and there were also no changes in the physical property and the color tone thereof.

$T_2$ (discharge stability):

The ink was discharged continuously for 24 hours in the respective atmospheres of a room temperature, $5°$ C., and $40°$ C. It was ascertained that stable and high quality recording could be done throughout the operation under all the temperature conditions.

$T_3$ (discharge responsiveness):

Comparison was made between intermittent ink discharge at every two seconds and ink discharge after it was left standing for two months. In either case, there took place no clogging of the orifice at the distal end of the nozzle, and the recording could be done stably and uniformly.

$T_4$ (quality of recorded images):

Images recorded on each of those recording materials shown in the Table below had high density and clearness. Lowering in density of the images after they were exposed to room light was less than 1%.

| Recording Material | Class | Manufacturer |
|---|---|---|
| Gin-Kan (Silver Ring) | High Quality Paper | Sanyo Kokusaku Pump Co., Ltd. Japan |
| Seven Star | High Quality Paper | Hokuetsu Seishi Co., Ltd., Japan |
| Shiro-Botan (White Peony) | Medium Quality Paper | Honshu Seishi Co., Ltd. Japan |
| Toyo Roshi No. 4 | Non-sized Paper | Toyo Roshi Co., Ltd., Japan |

$T_5$ (image fixing property to every sort of the recording material):

Letters and/or characters were printed on the above-listed recording materials. After 15 seconds' lapse, the printed portion was rubbed with a finger to observe occurrence of blurring or running of printed image. Neither blurring nor running of the printed image took place, and the ink exhibited excellent image fixing property.

EXAMPLES 2 to 5

The recording ink was prepared by the same process steps as mentioned in Example 1 above, using the below-listed various dyestuffs available in general market. The ink prepared by using each of the dyestuffs was then evaluated for its characteristics $T_1$ to $T_5$ in the same manner as in Example 1 above. All the inks showed excellent results.

| Ex. No. | Dyestuff | Concentration of $Ca^{++}$ in INK |
| --- | --- | --- |
| 2 | WATER YELLOW 6 (by Orient Chem. Co.) | 0.3 ppm |
| 3 | CHUGANOL-FAST RED 3B (By Chugai Kasei Co., Ltd.) | 0.8 ppm |
| 4 | KAYARUS TURKISH BLUE GL (By Nihon Kayaku Co., Ltd.) | 2.0 ppm |
| 5 | CIBARAN BLACK BGL (By Chiba-Gaigy A.G.) | 1.2 ppm |

For evaluation of the characteristics of the inks prepared in these Examples, use was made of a recording apparatus having an "on-demand" type multinozzled recording head which performs recording by generating ink droplets through application of heat to the ink within the recording head (diameter of discharge orifice of 35 microns; resistance value of resistive heat generating member of 150 ohms; drive voltage of 30 volts; and frequency of 2 KHz).

EXAMPLE 6

Full-colored photographs were reproduced by the same ink jet recording apparatus as utilized in Examples 2 to 5 above, using the ink of Example 2 as yellow ink, the ink of Example 3 as magenta ink, the ink of Example 4 as cyan ink, and the ink of Example 5 as black ink. The obtained images showed high clearness in color and good color reproduction.

EXAMPLE 7

The ink in each color as prepared in Examples 2 to 5 was filled in an individual felt-tip pen which was left unused for one week with a cap having been removed. After passage of one week, inscription was made on a sheet of paper using the felt-tip pen. Smooth writing could be done without the pen having become scratchy on the surface of paper.

COMPARATIVE EXAMPLE

The following ingredients were mixed and dissolved, followed by filtering the solution under pressure through a "Teflon" filter having an average pore size of 1 micron. The filtered liquid was made ink.

| Ingredients | Parts by weight |
| --- | --- |
| Dyestuff (20% aqueous solution of "WATER BLACK 187L) | 15 |
| Diethylene glycol | 30 |
| N—methyl-2-pyrrolidone | 10 |
| Deionized water | 45 |

The calcium ion concentration in this ink was 17 ppm.

When this ink was evaluated for its characteristics as identified by $T_1$ through $T_5$ same as in Example 1 above, there was recognized deposition of insoluble components in the ink after one-month's storage of the same.

Further, as regards its discharge stability ($T_2$), non-discharge of the ink was observed frequently, and, as for its discharge responsiveness ($T_3$), the orifice was clogged after its one-month's standing, which made it unable to resume the ink discharge.

What is claimed is:

1. In an improved method for recording images on a recording material by ejection of recording liquid containing a water-soluble, calcium ion-contaminated dyestuff through one or more fine nozzles onto a recording medium, the improvement comprising: selecting and employing a recording liquid in which the calcium ion concentration is 3 ppm or less.

2. A method for recording images according to claim 1 wherein the recording liquid is an aqueous recording liquid.

3. A method for recording images according to claim 1 wherein the recording liquid is an aqueous recording liquid further containing a water-soluble organic solvent.

4. A method for recording images according to claim 1 wherein the recording liquid contains said dyestuff in an amount of 1 to 5 weight percent.

5. A method for recording images according to claim 1 wherein the recording liquid is ejected using an on-demand type ink jet recording system.

6. A process for forming a recording liquid suitable for ink jet recording and writing having a calcium ion concentration less than 3 ppm comprising;
 (a) dissolving a water-soluble calcium ion contaminated dyestuff capable of forming a recording liquid having a calcium ion concentration of more than 3 ppm in water to form a dye solution;
 (b) treating the dye solution to remove excess calcium ion contaminants; and
 (c) adding a water-soluble organic solvent to the dye solution to form the recording liquid.

7. The process for forming a recording liquid according to claim 6 wherein the step of treating the dye solution to remove excess calcium ion concentration comprises: (i) adding sodium sulfate to an aqueous solution of the dyestuff to form a calcium precipitate; (ii) filtering the calcium precipitate from the aqueous dyestuff solution; (iii) washing the filtered aqueous dyestuff solution with a saturated aqueous solution of sodium sulfate and (iv) drying the washed dyestuff solution to form a refined dyestuff.

8. The recording liquid product of claim 7.

9. The recording liquid product of claim 6.

10. A process for forming a recording liquid suitable for ink jet recording and writing according to claim 6 wherein the recording liquid is to be ejected using an on-demand type ink jet recording system.

* * * * *

UNITED STATES PATENT AND TRADEMARK OFFICE
CERTIFICATE OF CORRECTION

PATENT NO. : 4,677,445

DATED : June 30, 1987

INVENTOR(S) : MASAHIRO HARUTA

It is certified that error appears in the above-identified patent and that said Letters Patent is hereby corrected as shown below:   Title page:

AT [57] IN THE ABSTRACT

Line 6,　"10 ppm" should read --3 ppm--.

COLUMN 6

Line 43,　"ion contami-" should read --ion-contami- --.

Signed and Sealed this

First Day of December, 1987

Attest:

DONALD J. QUIGG

Attesting Officer　　　　　Commissioner of Patents and Trademarks